Patented Dec. 31, 1929

1,741,674

UNITED STATES PATENT OFFICE

GEORGE BARSKY, OF NEW YORK, N. Y., AND PALMER W. GRIFFITH, OF ELIZABETH, NEW JERSEY, ASSIGNORS TO AMERICAN CYANAMID COMPANY, OF NEW YORK, N. Y., A CORPORATION OF MAINE

PROCESS OF PRODUCING CYANAMID

No Drawing.     Application filed February 8, 1924.  Serial No. 691,478.

This invention relates to a process of producing cyanamid from salts of cyanamid, and especially from crude commercial calcium cyanamid and has for its object to improve the procedures heretofore proposed.

With these and other objects in view, the invention consists in the novel steps and combinations of steps constituting the process, all as will be more fully hereinafter disclosed and particularly pointed out in the claims.

In order that the invention may be the more clearly understood, it is said: It is well known that free cyanamid $H_2CN_2$ is an unusually active chemical compound. It polymerizes to form dicyandiamid, it hydrolyzes to form urea, and it combines with ammonia to form guanidine, all these reactions being rapid and complete. It is indeed so reactive that the preparation of the pure compound in the free state from its commercial salt, crude calcium cyanamid, or lime nitrogen, is attended with considerable difficulty. This chemical reactivity makes the free compound $H_2CN_2$ exceedingly valuable for many chemical syntheses and numerous processes have been suggested for its preparation. But all these methods we have found to involve the serious disadvantage that they yield free cyanamid $H_2CN_2$, in an exceedingly dilute solution contaminated with substantial amounts of cyanamid decomposition products such as dicyandiamid, melamine, ammonia, guanidine, etc.

It has been proposed to neutralize solutions of said crude calcium cyanamid with acids and then to evaporate the solutions under reduced pressure for the recovery of solid cyanamid $H_2CN_2$. But in such cases, we have found that the neutralization as ordinarily conducted yields cyanamid solutions contaminated with one or more of the above mentioned decomposition products, and that solutions of $H_2CN_2$ so produced cannot be concentrated or stored without some further decomposition.

In this invention, on the other hand, we have discovered from our experiments in attempting to produce concentrated cyanamid solutions the surprising fact that solutions originally neutral and stable may become alkaline during concentration and that the alkali so formed has an exceedingly prejudicial effect on the subsequent stability of cyanamid, $H_2CN_2$. Further, by a study of the transformations which cyanamid undergoes in an aqueous solution, we have discovered that the reactions and the stability of cyanamid solutions are completely determined by their hydrogen ion concentration.

That is to say, it has been discovered that a hydrogen ion concentration lower than $10^{-8}$ normal, and even as low as $10^{-12}$ normal, will cause the formation of dicyandiamid in substantial quantities, all as disclosed in the co-pending application Serial No. 644,501, filed on June 9, 1923, by one of these applicants, George Barsky, and which application is entitled Process for making dicyandiamid. On the other hand, in an application of even date herewith, Serial No. 691,479 and filed by the present applicants, and entitled Process of producing urea, there is disclosed the fact that at hydrogen ion concentrations of from $10^{-2}$ normal and up to and including $10^{-1}$ normal, and higher, cyanamid is hydrolyzed to urea at appreciable velocities. In this application, on the other hand, we have further discovered the fact that when the hydrogen ion concentration is higher than $10^{-8}$ normal, and is lower than $10^{-2}$ normal, cyanamid is substantially stable and neither hydrolyzes to urea nor polymerizes to dicyandiamid, to any objectionable extent. In other words, this invention involves the discovery that between the limits of $10^{-8}$ normal hydrogen ion concentration and $10^{-2}$ normal hydrogen ion concentration, solutions of cyanamid $H_2CN_2$ are substantially stable, and they may be stored as such or concentrated if desired, provided the hydrogen ion concentration is maintained between these limits by addition of an acid or an alkali as required, all as will be more fully disclosed hereinafter.

By employing this discovery we are not only enabled to maintain cyanamid solutions in a stable form for an indefinite length of time but we are also enabled to produce cyanamid solutions from crude commercial calcium cyanamid without the formation of dicyandiamid, urea, or other undesirable products. In fact, by dissolving the crude calcium cyanamid in water under such conditions that the hydrogen ion concentration of the solution is always kept between the limits of $10^{-2}$ normal to $10^{-8}$ normal, we may secure commercially pure cyanamid solutions of a high standard of purity which may be stored without danger of decomposition.

To adjust and maintain the hydrogen ion concentration between these last named limits, we may employ any convenient acidic or alkaline reagent, such as sulphuric acid or sodium hydroxide. The additions of the acidic or alkaline reagent to the solution are made whenever the hydrogen ion concentration is found to be outside the desired limits. As acidic reagents we may, in fact, employ any of the known acids, such as acetic acid, sulphuric acid or hydrochloric acid or we may employ acid anhydrides or acid salts such as sodium acid sulphate, etc. We also prefer to employ acids whose calcium salts are insoluble in said solutions between the desired limits of hydrogen ion concentration employed so that by a simple filtration we may remove the precipitated calcium salts from the cyanamid solutions.

The cyanamid solution thus produced, which may or may not be free from calcium salts, depending upon whether or not an acidic reagent was employed whose calcium salt is insoluble in said solutions, may then be concentrated, as by heating the same for the recovery of free cyanamid or said solution may be used in other arts, such as the production of cyanamid derivatives.

As an example of our process we may proceed as follows: To five parts of water by weight we add one part of crude calcium cyanamid, the cyanamid addition being made slowly; while this cyanamid addition is being made, we add to the mixture sufficient dilute sulphuric acid of a strength of 1 part of sulphuric acid to say 5 parts of water to maintain the hydrogen ion concentration of the mixture between the limits $10^{-2}$ and $10^{-8}$ normal. The solution is also vigorously stirred and artificially cooled during the said addition. When all the calcium cyanamid has been added, the mixture is filtered to remove insoluble salts. The resulting solution may then be concentrated, preferably in vacuo, the hydrogen ion concentration being adjusted during the operation to maintain it between the desired limits.

For the determination of the hydrogen ion concentration of such solutions we may employ either the well known hydrogen electrode or chemical indicators, which have been previously standardized against the hydrogen electrode. The concentration of the cyanamid may then be continued to a small volume, whereupon the solution is filtered to remove traces of calcium sulphate and then cooled. Substantially pure crystals of free cyanamid may be recovered.

As an alternative procedure we may add the calcium cyanamid and the acidic reagent separately. When so proceeding we extract the calcium cyanamid with water, maintaining the temperature of the mixture below 40° C. in order to diminish the proportion of undesirable decomposition products, which are likely to be formed under such unfavorable hydrogen ion concentrations as may exist. After filtering the mixture in this alternative procedure, we add to the solution of calcium acid cyanamid thus obtained the desired acidic reagent in order to bring the hydrogen ion concentration of the mixture between the desired limits of $10^{-2}$ normal an $10^{-8}$ normal.

Instead of the crude calcium cyanamid above mentioned, we may use as a base material any of the alkali metal or alkali earth metal cyanamids, and in fact any soluble salt of cyanamid.

It will now be clear that we have disclosed a procedure by which one may dissolve a suitable cyanamid in water, add to the mixture an acidic reagent, in such proportions as will produce a hydrogen ion concentration between $10^{-2}$ normal and $10^{-8}$ normal; that this said concentration should be maintained during the making of the solution and may be maintained indefinitely by subsequent additions of acidic or alkaline reagents; and that so long as said concentration is maintained said original solution will not during storage decompose into undesirable products, so that a commercially pure $H_2CN_2$ product may be produced therefrom at a later time.

It is obvious that those skilled in the art may vary the details of the procedure without departing from the spirit of the invention; therefore it is not desired to be limited to the foregoing disclosure, except as may be required by the claims.

What is claimed is:

1. The process of making a substantially pure cyanamid from an alkali earth metal cyanamid salt, which consists in making a solution of said salt; adding an acidic reagent to said solution capable of producing hydrogen ions and in such proportions that the hydrogen ion concentration of the mixture will be maintained between $10^{-2}$ normal and $10^{-7}$ normal.

2. The process of making a substantially pure cyanamid from an alkali earth metal cyanamid, which comprises mixing said alkali earth metal cyanamid with water and sulphuric acid in such proportions that the hydrogen ion concentration of the mixture will be maintained between $10^{-2}$ normal and $10^{-7}$ normal.

3. The process of making a substantially pure cyanamid from a crude alkali earth metal cyanamid, which consists in mixing said alkali earth metal cyanamid with water; adding an acidic reagent thereto capable of producing hydrogen ions in such proportions as to cause the hydrogen ion concentration in the mixture to be maintained between $10^{-2}$ normal and $10^{-7}$ normal; separating out any impurities present in the solution; and recovering the desired cyanamid from the solution thus obtained.

4. In the process of producing cyanamid, the step of rendering cyanamid solutions stable, which comprises adjusting and maintaining in said solutions a hydrogen ion concentration between the limits of $10^{-2}$ normal and $10^{-7}$ normal.

5. In the process of producing cyanamid, the step of rendering cyanamid solutions stable while concentrating the same, which consists in adjusting and maintaining the hydrogen concentration in said solutions between the limits of $10^{-2}$ and $10^{-7}$ normal.

In testimony whereof we affix our signatures.

GEORGE BARSKY.
PALMER W. GRIFFITH.